Aug. 10, 1965  E. GRASWICH  3,199,683
PORTABLE AND ADJUSTABLE RACK FOR SUPPORTING PANS
Filed Dec. 30, 1963  4 Sheets-Sheet 1
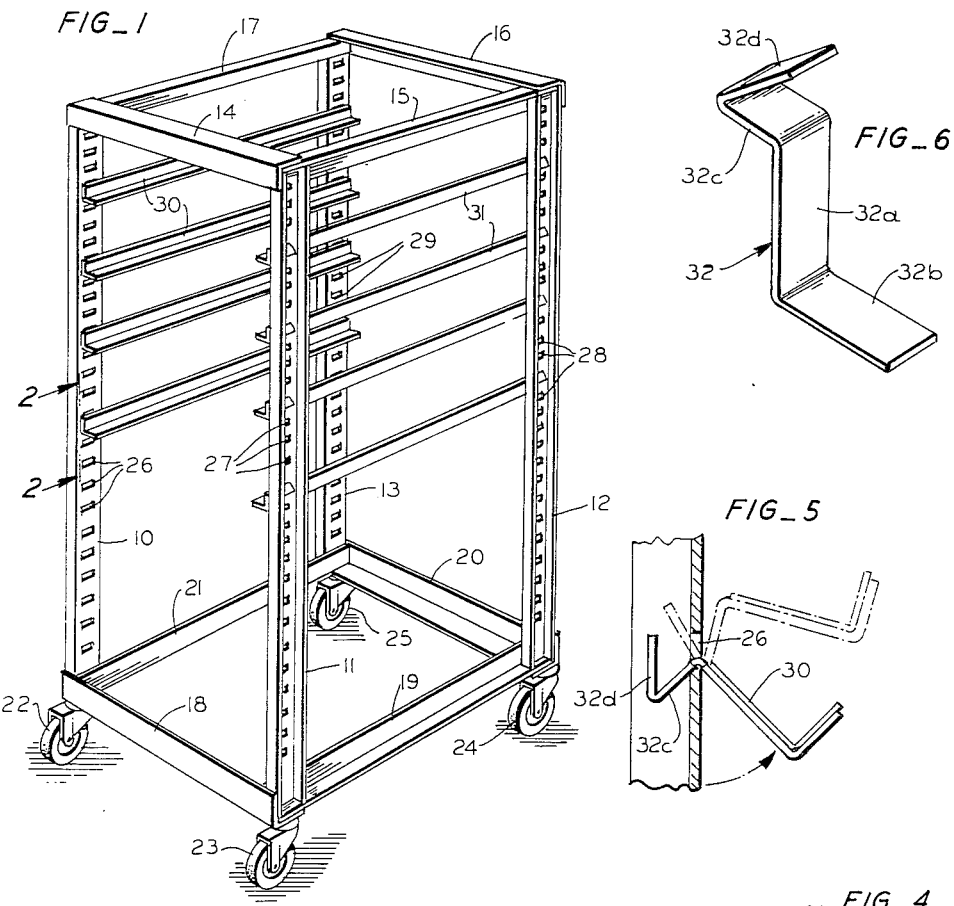
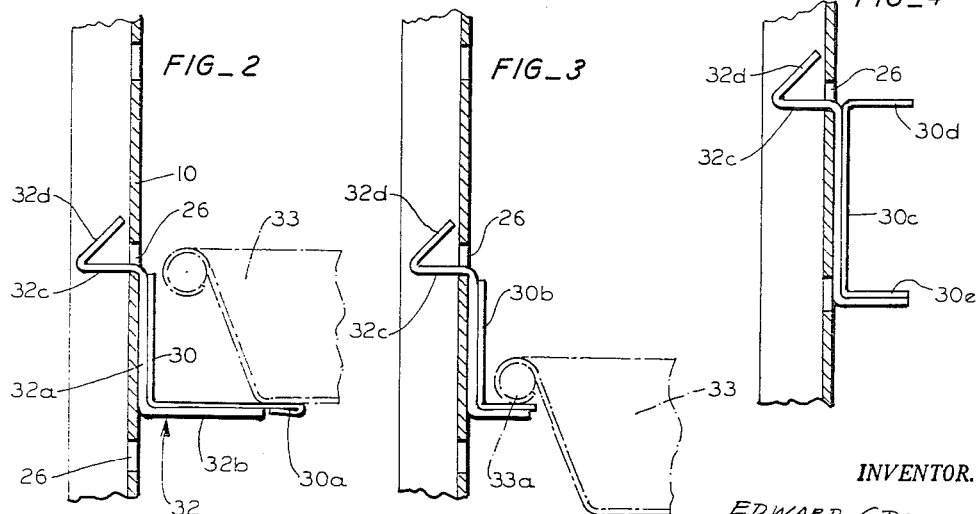
INVENTOR.
EDWARD GRASWICH
BY Allen and Chromy
ATTORNEYS Aug. 10, 1965 E. GRASWICH 3,199,683
PORTABLE AND ADJUSTABLE RACK FOR SUPPORTING PANS
Filed Dec. 30, 1963 4 Sheets-Sheet 2
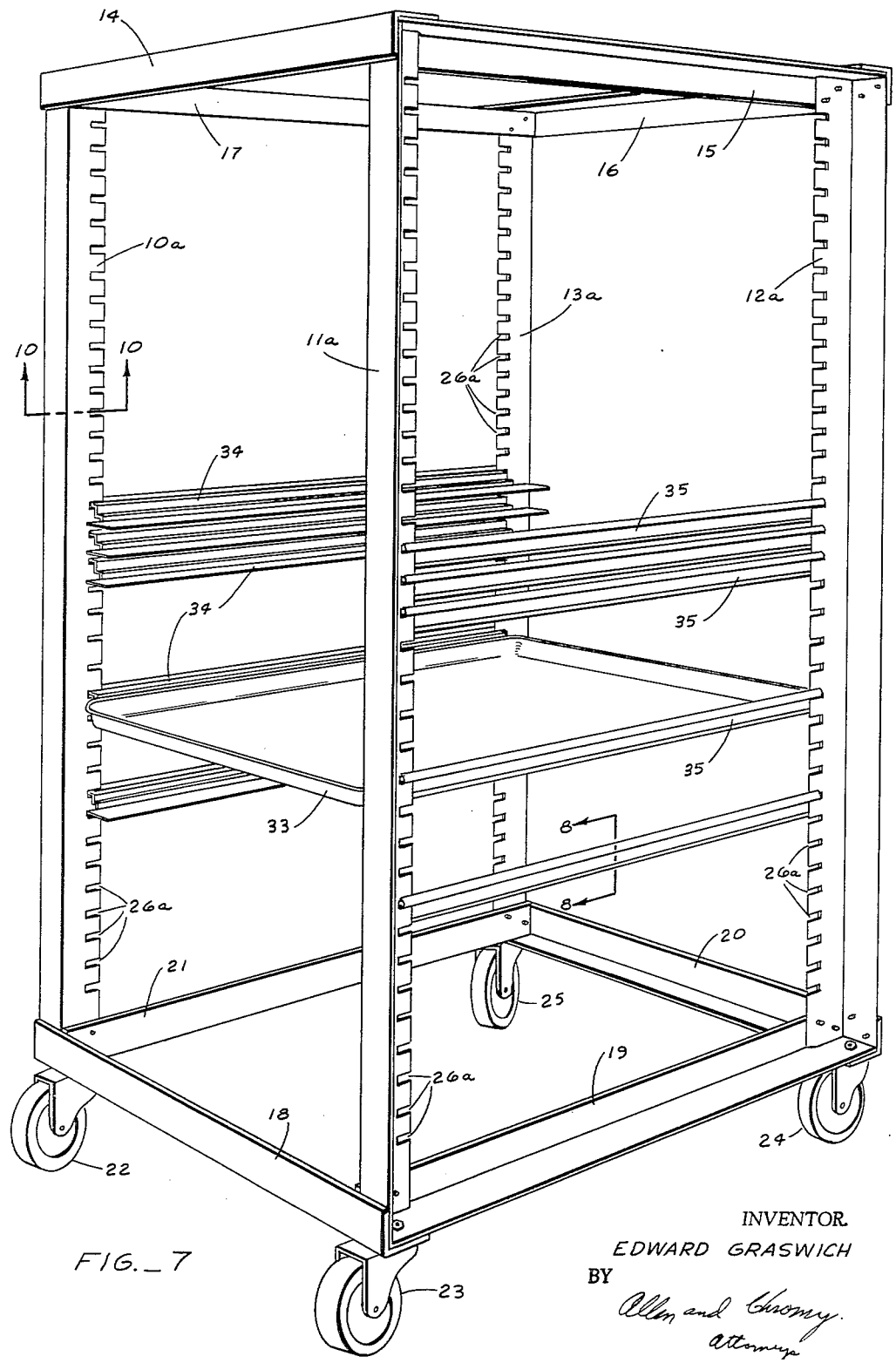
FIG._7
INVENTOR.
EDWARD GRASWICH
BY
Allen and Chromy
Attorneys Aug. 10, 1965   E. GRASWICH   3,199,683
PORTABLE AND ADJUSTABLE RACK FOR SUPPORTING PANS
Filed Dec. 30, 1963   4 Sheets-Sheet 3
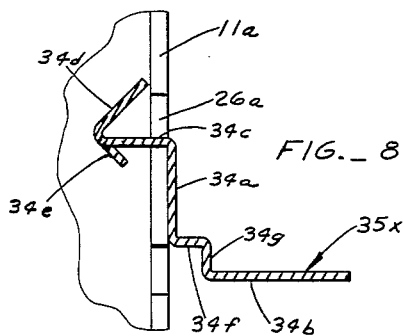
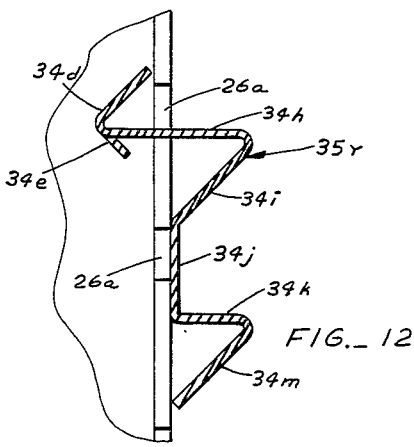
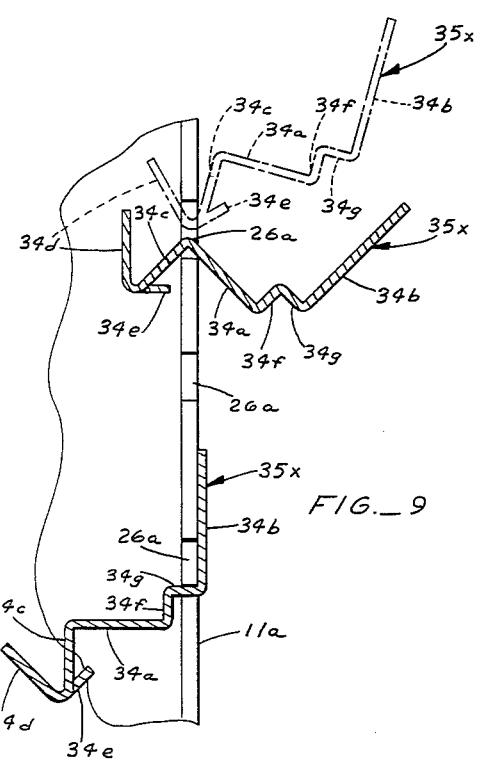
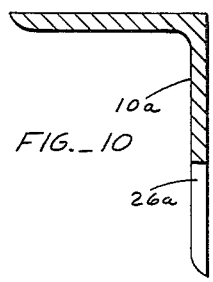
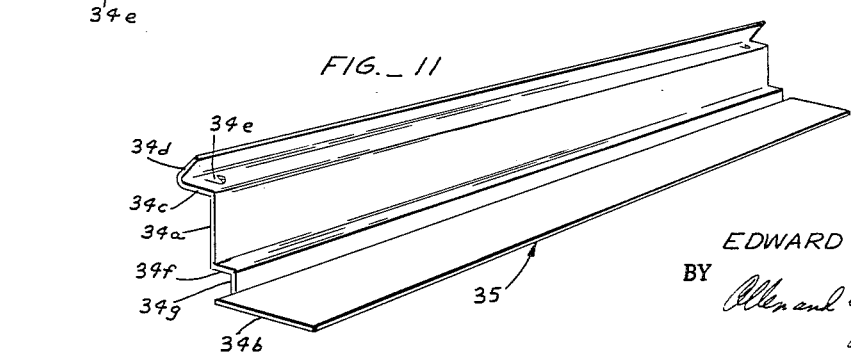
INVENTOR.
EDWARD GRASWICH
BY
Allen and Kenny
Attorneys

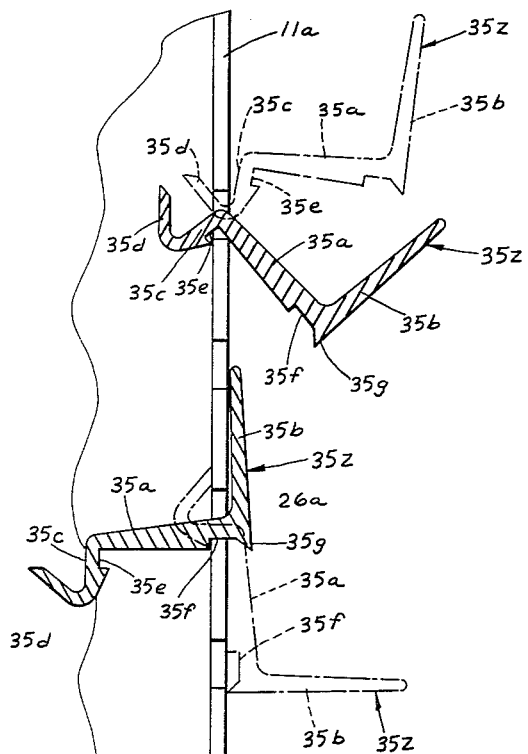
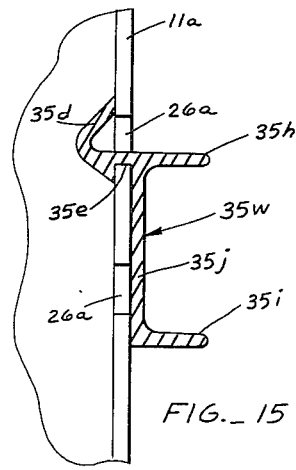
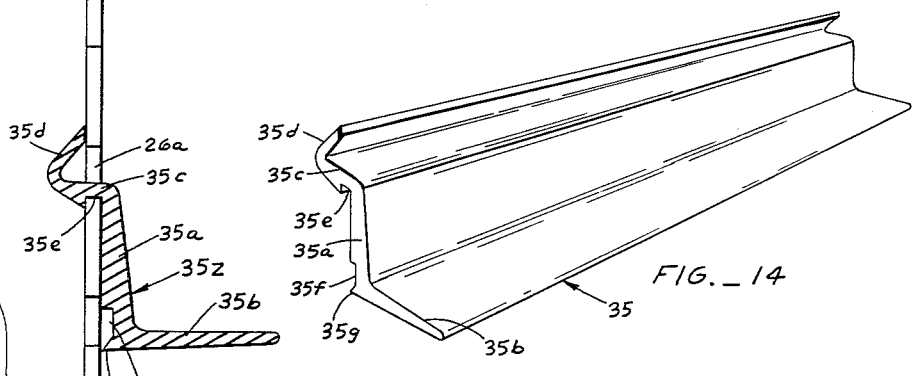

United States Patent Office 3,199,683
Patented Aug. 10, 1965

3,199,683
PORTABLE AND ADJUSTABLE RACK FOR
SUPPORTING PANS
Edward Graswich, Walnut Creek, Calif., assignor to Dohrmann Hotel Supply Co., Brisbane, Calif., a corporation of California
Filed Dec. 30, 1963, Ser. No. 334,301
5 Claims. (Cl. 211—71)

This application is a continuation in part of my application Serial No. 108,163, filed May 5, 1961.

This invention relates to a portable and adjustable rack for slidably receiving and supporting a plurality of pans horizontally one above the other.

An object of this invention is to provide an improved rack for supporting several pans horizontally one above the other, said rack being readily adjustable without tools to receive different size pans.

Still another object of this invention is to provide an improved rack with removable angle-shape slides which are adapted to function as supports for pans or the like and which cannot be accidentally removed when the pans are being placed thereon.

Still another object of this invention is to provide an improved rack with slotted upright members that are provided with horizontally disposed angle-shaped slides upon which pans or the like are adapted to be slidably disposed. These slides may be provided with bent clip-type brackets each of which includes a hook-shaped upper portion or the slides may themselves be made with a hook-shaped upper portion integral therewith. In either case, this hook-shaped portion or a part thereof is adapted to be inserted into a selected slot of each of the upright members for supporting the slide thereon. The slide may be removed from the upright members only by turning the slide upward and then by giving it a slight downward motion to free the hook-shaped portion of the slide from the slot. Furthermore, the slides cannot be removed from the upright members when a pan is resting thereon.

A further object of this invention is to provide an improved rack for supporting pans, said rack having removable angle-shaped slides which are provided with hook-shaped upper portions that are adapted to be inserted into selected slots of the rack for supporting the slides on said rack, said slides also being provided with indented or recessed parts which are adapted to cooperate with said slots for holding said sides on the rack tilted in out-of-the-way positions, so that slides positioned above a pan on which a high article such as a cake is positioned will not interfere with such article.

Other and further objects of this invention will be apparent to those skilled in the art to which it relates from the following specification, claims and drawings.

In accordance with this invention, there is provided an improved portable and adjustable rack for slidably receiving and supporting a plurality of pans horizontally one above the other so that the pans may be conveniently moved from place to place thereby. This rack is provided with a plurality of substantially equally spaced slots so that corresponding slots in the different upright members are at substantially the same elevation. In one embodiment of the invention these slots are adapted to receive bent clip-type brackets, each of which is provided with an upper hook-shaped portion that is adapted to be received by any one of the slots of the upright members.

Angle-shaped slide members are attached to correspondingly shaped portions of these brackets, and these brackets are spaced on these slide members a distance such that the hook-shaped portion of one of the brackets attached to a slide may be positioned in a slot of one of the upright members while another bracket attached to the same slide is adapted to have its hook-shaped portion received by a corresponding slot in another of the upright members whereby the slide is adapted to be supported in a horizontal position between these upright members to serve as a support for one side of a pan or similar article. Another slide similarly provided with a pair of brackets is adapted to be supported at a corresponding elevation on oppositely disposed upright members to serve as a support for the other side of the pan or like article. A plurality of such slides may be supported on the upright members at predetermined elevations so that several pans may be supported horizontally one above the other on the rack.

In another embodiment of this invention, the upper part of each of the slides is made of hook-shape and opposing edges of the upright members are slotted to receive the end parts of the hook-shaped portions of each of the slides.

The slides can be removed and adjusted to different positions simply and easily without tools and without the use of force or exacting care in matching of mating parts. Thus the slots in the upright members are made oversize to permit very easy access for the clips without any great amount of care to properly position the mating parts. Also, the slides may be removed by merely lifting the slide with a rolling motion and then moving the slide toward the center of the rack when the normally horizontal portion of the angle-shaped slide reaches a position roughly in a vertical plane. No force beyond that required to lift the slide is necessary.

Furthermore, inadvertent force applied to the bottom or front of a slide will not cause the slide to leave its desired position. In use, the slides are often hit from the bottom and from the front while loading pans or trays into the rack. This does not, however, dislodge the slide from its positions on the upright members and at most causes the slide to roll upward temporarily and then the weight thereof causes the slide to drop back to its normal position.

The slides of this invention may also be tilted to their out-of-the-way position on the rack. Thus slides that are positioned above a pan on which a relatively high article is being carried may be tilted to their out-of-the-way position so that they will not interfere with the article. This is important where an article such as a cake is being carried on one of the pans of the rack and the article is relatively close to the edge of the pan so that, if the slides above the pan were not tilted out of the way, they might cut into the cake or scrape some of the frosting therefrom.

Other features and advantages of this invention will be apparent to those skilled in the art to which it relates from the following specification, claims and drawing in which, briefly:

FIG. 1 is a perspective view of a rack of this invention showing a plurality of slides assembled thereon;

FIG. 2 is a sectional view taken along the line 2—2 of FIG. 1;

FIG. 3 is a sectional view similar to that of FIG. 2 except that the pan supported by the slide is supported by its rim on a narrower slide;

FIG. 4 is a sectional view similar to that of FIG. 2 showing a modified form of slide pan support whereby a pan may be supported on the top surface of the slide as well as on the bottom portion thereof;

FIG. 5 is a sectional view similar to the sectional view of FIG. 2 showing how a slide is removed by imparting a rolling motion thereto with respect to the upright member and also showing in broken outline the slide and bracket being disassembled from the upright by withdraw- FIG. 6 is a perspective view of one of the bent clip-type brackets which is attached to the slides in accordance with this invention;

FIG. 7 is a perspective view of another embodiment of this invention;

FIG. 8 is a sectional view taken along the line 8—8 of FIG. 7;

FIG. 9 is an enlarged view of a portion of one of the upright members of the rack and portions of two of the slides engaging a slot in the upright member, one of the slides being tilted to its out-of-the-way positions;

FIG. 10 is a sectional view taken along the line 10—10 of FIG. 7;

FIG. 11 is a perspective view of one of the slides made out of sheet metal;

FIG. 12 is a sectional view showing a slide formed to support two pans, one above the other;

FIG. 13 is a view showing a portion of one of the upright members of the rack and portions of three slides which are made of extruded metal or plastic, one of said slides being shown in normal pan-supporting position, another of said slides being shown tilted to its out-of-the-way position, and the third of said slides being shown in the process of being removed from the rack;

FIG. 14 is a perspective view of one of the slides made out of extruded metal or plastic; and FIG. 15 is a sectional view showing a slide made out of extruded metal or plastic formed to support two pans, one above the other.

Referring to the drawing in detail, there is shown in FIG. 1 a rack made up of upright members 10, 11, 12 and 13 which are provided with substantially equally spaced slots 26, 27, 28 and 29, respectively, such that these different upright members have slots at substantially the same elevations.

A plurality of angle members 18, 19, 20 and 21 which may be made of metal, are joined by welding, suitable bolts, rivets or the like to form a substantially rectangular frame member to which the lower ends of the channel members 10, 11, 12 and 13 are attached also by welding, bolts, rivets or the like. Suitable casters 22, 23, 24 and 25 are attached to the corner portions of this frame member so that the rack is readily portable. A similar substantially rectangular frame member made up of the angle members 14, 15, 16 and 17 which are joined together in similar manner and the top portions of the upright channel members 10, 11, 12 and 13 are attached thereto also by welding, bolts, rivets or the like.

Several slides 30, which are also of angle material are adapted to be supported on the upright members 10 and 13 by brackets such as shown in FIGS. 2, 3, 4, 5 and 6 which are attached to the end portions of these slides by spot welding, for example. The bent clip-type brackets 32, such as shown in FIGS. 2 and 6, are provided with angle-shaped portions including the upright portion 32a and the horizontal portion 32b which are adapted to engage the sides of the slide 30 and are attached thereto by spot welding or the like. Thus each end portion of each slide 30 is provided with a bracket 32. Each bracket 32 is provided with an upper hook-shaped portion including the horizontal part 32c the inner end of which is adapted to engage the lower surface of the slot 26 when it supports the slide 30 on the upright member 10. The inclined part 32d of the bracket extends from the horizontal part 32c and the free end thereof is adapted to engage the upright 10 above the slot 26 to prevent removal of the bracket from the upright except by rolling it as shown in FIG. 5 so that the hook-shaped portion of the bracket may be withdrawn from the slot.

Thus the slides 30 are supported substantially parallel to each other as shown in FIG. 1 by brackets 32 attached thereto. In like manner a plurality of slides 31 opposed to slides 30 and parallel thereto, are supported on upright members 11 and 12 also by brackets such as brackets 32 attached thereto so that pans such as pan 33 may be supported between opposed pairs of these slides 31–32.

Slide 30 may also be provided with a portion 30a which is bent back to provide reinforcing to the slide and the pan 33 may rest on this part of the slide. On the other hand the underside of the rim 33a of the pan may rest on the slide as shown in FIG. 3 and in this case the horizontal part of the slide is narrower than that part of the slide shown in FIG. 2. Also, a channel-shaped type of slide such as the slide 30c may be used if desired and in this case the horizontal portions 30e and 30d may be of such width that pans 33 may be supported thereon as shown either in FIGS. 2 or 3. Slides 31 may also be modified in this manner so that the opposed pairs of slides are uniform.

Another embodiment of this invention is illustrated in FIGS. 7–15 and the same reference numerals are applied to the parts shown in these figures which correspond to parts shown in FIGS. 1–6. The rack shown in FIG. 7 is provided with corner upright members 10a, 11a, 12a and 13a which are of angle-shape as shown in FIG. 10. The shape shown in FIG. 10 may be of extruded aluminum or sheet metal which is bent into the desired angular shape. These upright members 10a, 11a, 12a and 13a are each provided with notches such as the notches 26a shown in FIGS. 8, 9, 12, 13 and 15 which are substantially uniformly spaced so as to receive end portions of the slides 34 and 35 and hold these slides substantially parallel to the upper side frame members 15 and 17 and lower side frame members 19 and 21 of the rack. The notches provided to the upright members 10a and 13a are cut or formed in the sides facing each other. Likewise the notches provided to the upright members 11a and 12a are cut or formed in the sides of these members that face each other. Thus the slides 34 are adapted to be inserted into the notches formed in upright members 10a and 13a while the slides 35 are adapted to be placed into the notches formed in the upright members 11a and 12a and pans such as the pan 33 may be slidably supported on corresponding slides 34 and 35.

The slides 34 and 35 may be made out of extruded metal such as aluminum or plastic and, in that case, they are made of the cross-sectional shape such as shown in FIGS. 13, 14 and 15. On the other hand, these slides may be made out of sheet metal which is bent into the desired configuration and, in that case, the cross-sectional shape is such as shown in FIGS. 8, 9, 11 and 12. In either case, this cross-sectional shape is the same throughout the length of the slide so that the hooked-shaped upper portion of the slide extends throughout the length thereof and gives the slide added strength while these hook-shaped portions at the ends of the slides cooperate with the notches in the upright members to hold the slide in the desired position on these members.

The cross sectional shape of the slides 34 and 35 may be made corresponding to the slide shapes shown in FIGS. 8, 12, 14 and 15. The slide 35x shown in FIGS. 8, 9, 11 and 12 is made of sheet metal bent to the desired configuration. This slide is provided with a section 34a which is vertical when the slide is positioned on the upright member 11a, as shown in FIG. 8, and it is also provided with a horizontal section 34b upon which the pan that is to be supported by the rack is positioned. The upper part of the slide is provided with a hook-shaped portion having the upper inclined part 34d and a horizontal part 34c out of which the ears 34e are punched, one in each end portion of the slide, as shown in FIG. 11. The horizontal part 34c is adapted to rest on the bottom surface of the selected notch 26a in each of the supporting upright members.

The parts 34d and 34e are provided to the slide for the purpose of preventing accidental removal of the slide from the supporting notches 26a of the upright members. Thus the slide 35x shown in FIG. 9 may be removed only by a series of movements which include first the lifting of the slide to the position shown in broken lines so that the catch 34e is withdrawn from the slot 26a. Thereafter, the slide is moved downward so that the part 34d is withdrawn from the slot 26a.

If the slide 35x is to be left supported on the uprights of the rack in its out-of-the-way position, it is simply tilted upward by engaging the horizontal bottom part 34b so that the part 34g thereof is brought into engagement with the bottom surface of the slot 26a. The part 34b of the slide is then held against the upright 11a by the weight of the hanging part, and the part 34f prevents the slide from moving inward. It will be noted from an inspection of FIG. 11 that the bottom part 34b of the slide is longer than the rest of the slide. This longer part engages the uprights and prevents the slide from being pushed through the slots 26a any farther than shown in the case of the bottom slide 35x in FIG. 9. This is prevented by the extending end parts of the bottom portion 34b because they extend beyond the slots 26a as shown in FIG. 7.

The slides also may be made of the configuration illustrated by slide 35y in FIG. 12 so that two pans may be supported on each pair of cooperating slides. The slide 35y is provided with horizontal pan-supporting parts 34h and 34k. Inclined parts 34i and 34m are provided below these horizontal parts 34h and 34k, respectively, and the lower end of inclined part 34i is joined to the inner end of horizontal part 34k by the vertical part 34j which is adapted to engage the sides of upright members to provide bracing thereto. The horizontal part 34h is adapted to rest on the bottom surface of the slots 26a in which the slide is supported. Catch members or ears 34e are punched out of the horizontal part 34h, and these members together with the inclined upper part 34d prevent the slide from being accidentally removed from the upright members.

The slides 35z and 35w, shown in FIGS. 13, 14 and 15 are made of extruded aluminum, magnesium, or alloys thereof, or plastic. The slide 35z is provided with a horizontal pan-supporting section 35b, one side of which is connected to the bottom of the vertical section 35a. The other horizontal section 35c, which is connected to the top side of the vertical section 35a, is provided with a notch or channel 35e which is adapted to be hooked into the selected notches 26a of the uprights, as shown in the bottom part of FIG. 13. The upper part 35d of the slide is hook-shaped and is inclined toward the upright so that the free end thereof extends above the selected notches 26a in which the slide is positioned. The part 35d and the channel 35e prevent the slide from being accidentally detached from the uprights. Thus the slide 35z can be removed from the uprights, it first must be lifted upward so as to detach the channel parts 35e from the uprights, and thereafter the slide must be rotated to the position shown in broken lines in the upper part of FIG. 13. The slide is then lowered to detach the part 35d thereof from the notches 26a.

The slide 35z may also be tilted to its out-of-the-way position, as shown in the middle part of FIG. 13, in which position the pan-supporting part 35b is substantially parallel to the uprights of the rack, and the channel part 35f is positioned on the bottom surface of the notches 26a of the uprights. One side of the channel 35f is provided with a projection 35g which prevents the slide 35z from being shoved all the way through the notches 26a when the slide is being tilted to its out-of-the-way position.

In FIG. 15 there is illustrated a slide 35w which is provided with two horizontal parts 35h and 35i for supporting two pans. These horizontal parts are connected by the vertical section 35j. The horizontal part 35h extends through the notches 26a and is provided with a channel 35e that is adapted to be hooked onto the bottom surfaces of the slots or notches 26a. This slide is also provided with an upper part 35d which is adapted to extend so that its free end engages the upright above the selected slots 26a when the slide is positioned on the uprights.

The brackets 32, shown in FIGS. 1 to 6 inclusive, may also be provided with catch members or ears such as 34e, shown in FIGS. 8, 9, 11 and 12, and in this case the catch members may be cut out of the horizontal parts 32c of these brackets. Also, these brackets 32 may be provided with offset parts such as the offset parts 34g and 34f, and in that case the slide 30 would be provided with a similar offset extending throughout the length thereof. When the brackets 32 and slide 30 are thus modified, the slide arrangement shown in FIGS. 1 to 6 inclusive is adapted to be supported on the rack shown in FIG. 7 in which the notches 26a are provided to the uprights and the slides 30 may then be shifted to their out-of-the-way positions. The horizontal pan supporting section of the slide may in that case be made longer than the vertical part the same as in the slide shown in FIG. 11.

While I have shown a preferred embodiment of the invention, it will be understood that the invention is capable of variation and modification from the form shown so that its scope should be limited only by the scope of the claims appended hereto.

What I claim is:

1. In a portable rack for slidably receiving and supporting a plurality of pans horizontally one above the other, the combination of a portable frame having a plurality of upright members, said upright members forming corner members of said frame, each of said upright members having a plurality of substantially equally spaced notches such that corresponding notches in said upright members are all positioned at the same elevation in said frame, a plurality of elongated angle-shaped slide members each having a vertical portion and a horizontal pan supporting portion, said slide members having inwardly tilted channel portions attached thereto, the end parts of said channel portions being loosely positioned in corresponding opposed notches of said upright members so that the upper end parts of said tilted channel portions are positioned adjacent to said upright members above these notches and the slide can be disengaged therefrom only by lifting the slide so that the horizontal part thereof is in a substantially vertical position and the upper walls of said selected slots extend into said channel portions and then unhooking the ends of the channel portions from the respective slots by moving the slide downwardly and inwardly.

2. In a portable rack for slidably receiving and supporting a plurality of pans horizontally one above the other, the combination of a portable frame having a plurality of upright members, said upright members forming corner members of said frame, each of said upright members having a plurality of substantially equally spaced notches such that corresponding notches in said upright members are all positioned at the same elevation in said frame, a plurality of elongated angle-shaped slide members each having a vertical portion and a horizontal portion, said slide members having inwardly tilted channel portions attached thereto, the end parts of said channel portions being positioned in corresponding opposed notches of said upright members so that the upper end parts of said tilted channel portions are positioned adjacent to said upright members above these notches, and the slide can be disengaged therefrom only by lifting the horizontal portion of the slide to a substantially vertical position and then unhooking the ends of the channel portions from the respective slots by moving the slide downwardly and inwardly, said vertical portion of each of said slides having a recess for engaging the lower wall surfaces of said selected opposed notches when the slide is tilted to its out-of-the-way position, in which position the horizontal portion of the slide engages the inner sides of said upright members above said selected notches.

3. In a portable rack for slidably receiving and supporting a plurality of pans horizontally one above the other, the combination of a portable frame having a plurality of upright members, said upright members forming corner members of said frame, each of said upright members having a plurality of substantially equally spaced notches such that corresponding notches in said upright members are all positioned at the same elevation in said frame, a plurality of elongated angle-shaped slide members each having a vertical portion and a horizontal pan supporting portion, said slide members having inwardly tilted V-shaped channel portions attached thereto, the end parts of said channel portions being loosely positioned in selected corresponding opposed notches of said upright members, said channel portions having horizontal parts engaging the bottom surfaces of said selected notches, the end portions of said horizontal parts having depending means for engaging said upright members to prevent said slides from being accidentally disengaged from said upright members and to permit the slide to be disengaged from said upright members only by lifting the side so that the horizontal part thereof is in a substantially vertical position and the upper walls of said selected slots extend into the V of said channel portions and then unhooking the ends of the channel portions from the respective slots by moving the slide downwardly and inwardly.

4. In a portable rack for slidably receiving and supporting a plurality of pans horizontally one above the other the combination of a portable frame having a plurality of upright members, said upright members forming corner members of said frame, each of said upright members having a plurality of substantially equally spaced notches such that corresponding notches in said upright members are all positioned at the same elevation in said frame, a plurality of elongated angle-shaped slide members each having a vertical portion and a horizontal pan supporting portion, said slide members having inwardly tilted channel portions attached thereto, the end parts of said channel portions being loosely positioned in corresponding opposed notches of said upright members so that the upper end parts of said tilted channel portions are positioned adjacent to said upright members above these notches, means depending from the lower end parts of said channel portions for engaging said upright members adjacent to said selected notches to prevent said slides from being accidentally disengaged from said upright members, said vertical portion of each of said slides having a recess for engaging the lower wall surfaces of said selected opposed notches when the slide is tilted to its out-of-the-way position in which position the horizontal portion of the slide engages the inner sides of said upright members above said selected notches.

5. In a portable rack for slidably receiving and supporting a plurality of pans horizontally one above the other the combination of a portable frame having a plurality of upright members, said upright members forming corner members of said frame, each of said upright members having a plurality of substantially equally spaced notches such that corresponding notches in said upright members are all positioned at the same elevation in said frame, a plurality of elongated angle-shaped slide members each having a vertical portion and a horizontal pan supporting portion, said slide members having inwardly tilted channel portions attached thereto, so that one side of these channel portions rests loosely on the bottom walls of corresponding opposed notches of said upright members and the upper end parts of the other side of said tilted channel portions are positioned adjacent to said upright members above these notches, a recess in said one side of each of said channel portions for receiving said bottom walls of said notches, said vertical portion of each of said sides having a recess for engaging the lower wall surfaces of said selected opposed notches when the slide is tilted to its out-of-the-way position in which position the horizontal portion of the slide engages the inner sides of said upright members above said selected notches.

References Cited by the Examiner

UNITED STATES PATENTS

| | | | |
|---|---|---|---|
| 1,298,359 | 3/19 | Lane | 211—162 |
| 1,504,522 | 8/24 | Sherer | 108—102 |
| 2,005,593 | 6/35 | Onions et al. | 108—109 |
| 2,139,322 | 12/38 | Miner | 248—361 |
| 2,538,958 | 1/51 | Augenfeld | 108—108 |
| 2,909,352 | 10/59 | Van Buren | 248—239 |
| 3,043,550 | 7/62 | Garbarino et al. | 248—361 |

FOREIGN PATENTS

| | | |
|---|---|---|
| 469,679 | 5/14 | France. |
| 1,200,778 | 12/59 | France. |

CLAUDE A. LE ROY, *Primary Examiner.*